United States Patent [19]

White

[11] Patent Number: 4,784,202

[45] Date of Patent: Nov. 15, 1988

[54] WHEEL RIM FASTENER

[75] Inventor: Basil D. White, Lauder Hill, Fla.

[73] Assignee: Tyron, Inc., Fort Lauderdale, Fla.

[21] Appl. No.: 69,830

[22] Filed: Jul. 6, 1987

Related U.S. Application Data

[62] Division of Ser. No. 801,061, Nov. 22, 1985, Pat. No. 4,694,874.

[51] Int. Cl.$^4$ .................. B60B 21/00; B60B 21/12
[52] U.S. Cl. ........................ 152/381.5; 152/381.6; 285/411; 285/419
[58] Field of Search .................. 152/381.5, 381.6, 399, 152/400, 401, 389, 390, 391; 301/95, 96, 97, 98; 403/344; 285/410, 411, 415, 419; 24/284, 285, 282, 20 R, 20 LS, 20 EE

[56] References Cited

U.S. PATENT DOCUMENTS 4,170,260 10/1979 Rudd et al. ................. 285/411
4,572,548 2/1986 Porowski et al. .............. 285/419

FOREIGN PATENT DOCUMENTS 0014097 8/1980 European Pat. Off. .......... 152/381.5

Primary Examiner—James B. Marbert
Attorney, Agent, or Firm—Lee C. Robinson, Jr.

[57] ABSTRACT

A band-type well obstructor for obstructing the well of the hub of a wheel rim, particularly for a pneumatic tire. The well obstructor has an inextensible band with integral circular protrusions mechanically extruded onto the band. The circular protrusions extend radially inwardly to abut against the base of the well to retain the band in position surrounding the well, and to resist crushing under the weight of the vehicle in the event of deflation of the tire. The well obstructor has a fastener assembly utilizing a screw with a groove adapted to receive a locking ring. The fastener assembly further has two transverse beams, one of which is adapted to fit over the end of the screw and abut against a locking washer placed between the transverse beam and the head of the screw. The locking ring is then snapped into place to hold this transverse beam in position. The second transverse beam is placed over the threaded end of the screw. This transverse beam has a countersunk notch on its lower portion which is adapted to receive a nut and to prevent relative rotation of the nut with respect to the second transverse beam.

7 Claims, 4 Drawing Sheets

WHEEL RIM FASTENER

This application is a division of application Ser. No. 801,061, filed Nov. 22, 1985, now U.S. Pat. No. 4,694,874, issued Sept. 22, 1987.

BACKGROUND OF THE INVENTION

This invention relates to a band device for obstructing the well of a hub of a wheel rim, particularly wheel rims for pneumatic tires, and to fastening devices which are particularly suitable for such bands.

Conventional pneumatic tires are commonly mounted on a wheel rim. Typically, the wheel rim has a hub with raised flanges at its axial ends for retaining the beads of the tire. When the tire is inflated, the internal pressure forces the beads against the inside surfaces of these flanges to retain the tire securely to the rim. If the tire is of the tubeless type, these flanges also act to seal against the beads to prevent any loss of air pressure.

The bead of the tire is relatively inextensible and has an internal diameter less than the outside diameter of the bead retaining flanges of the hub. To make it easier to install the tire on the wheel rim, the hub of such wheel rims commonly have an annular well which extends radially inwardly. This is sometimes called a drop-center type wheel rim. When it is desired to install the tire onto the wheel rim, one side of the bead can be placed around the bead retaining flange and into the well, thus enabling the diametrically opposing side of the bead to be placed over the bead retaining flange on the other side of the wheel rim. Removal of the tire is accomplished in the reverse manner.

After the tire is installed and the tire inflated with its bead seated against the flanges, the well serves no function. The presence of this well, however, has been found to pose safety problems. When pressure is unintentionally lost from the tire due to a blow out or puncture during operation, the well again becomes available to the bead of the tire. If the bead of the tire falls into this well, it is possible for the diametrically opposite side of the bead to unintentionally fall off the bead retaining flange, and thence for the entire bead to fall off the flange. When the bead of the tire is lost from the bead retaining flange, serious loss of control of a vehicle upon which the tire is mounted can result.

Removable, band-type well obstructors have been proposed for obstructing this well so that, in the event of deflation of the tire during operation, the interior of the well will not be available to the bead of the tire, thus insuring that the tire will remain on the wheel rim. When it is desired to remove the tire during maintenance operations, the tire is deflated and one bead pushed inwardly so as to expose the well obstructing band. The band can then be removed so that the tire can be removed in the normal manner. Such band devices are disclosed in U.S. Pat. No. 3,933,392, issued on Jan. 20, 1976 to William Neil Wells, U.S. Pat. No. 4,122,882 issued Oct. 31, 1978 to Fisher et al., and U.S. Pat. No. 4,391,317, issued July 5, 1983 to Bernard J. Savage.

The bands disclosed in these patents are retained around the well with rectangular, bent metal tabs which are adapted to enter the well, and to abut against the base of the well. The strength of the rectangular bent tabs is limited, however, and after unintentional deflation under heavy loads or at high speeds, the weight of the vehicle and related forces acting on the bead of the tire can crush the band and the rectangular tabs rendering the well obstructing band ineffectual. In addition, the rectangular tabs have only limited frictional resistance against the base of the well, and thus can permit undesirable rotation of the band with respect to the hub.

The bands are typically held onto the hub in circumferential tension by the use of threaded fasteners pulling together adjacent ends of the band. Where the wheel rim is large, the band may be in two, semi-circular portions, connected with a solid link at one pair of ends, and a threaded fastener at the other pair of ends.

A threaded fastener, as proposed in U.S. Pat. No. 4,391,317, uses an Allen head screw, a bar washer and a bar nut for drawing together the adjacent ends. Although the bar nut and bar washer fastener is generally sturdy, the screw has a tendency to loosen. Furthermore, maintenance personnel who change tires are occasionally unaccustomed to well obstructor bands. Because of this, such installers may misplace or misuse the parts of the fasteners which are necessary to securely hold the band onto the hub. This may be particularly acute where bar nuts are used, because these are not readily available, and if lost, the temptation to use a conventional fastener which was not designed to be used is great. If the fastener is installed improperly, the well obstructor band can become loose, thus resulting in a dangerous condition.

The solid links which have been proposed include a disk-ended dog bone link as disclosed in U.S. Pat. No. 4,122,882, or a bent strip of metal as in U.S. Pat. No. 4,391,317. The disk-ended dog bone link has not been found to be entirely satisfactory, however, because the round disks have a tendency to wedge open the openings in the corresponding flanges of the band portions through which the link passes. The bent strip of metal has limited strength.

OBJECTS OF THE INVENTION

Accordingly, it is an object of the present invention to provide a band-type well obstructor which will be more resistant to crushing under the weight of a vehicle.

More specifically, it is an object of the invention to provide such a well obstructor which serves as a stable platform for supporting the beads of a flat tire and thus results in controlled run-flat capability.

It is a further object of the invention to provide a well obstructor band which has a higher coefficient of friction than well obstructor band using rectangular retaining tabs, so that it is less prone to undesirable rotation with respect to the hub.

It is a further object of the invention to provide a fastener assembly for holding together adjacent ends of band portions that will not be prone to being improperly assembled, or having parts which can be easily misplaced.

SUMMARY OF THE INVENTION

These objects and others are accomplished in accordance with an embodiment of the present invention, which provides a removable band-type annular well obstructor for obstructing the interior of an annular well of a hub of a wheel rim, wherein the well has a predetermined radial depth. This obstructor includes an annular band of inextensible material of a predetermined axial width, a thickness which is substantially less than the depth of the well and is adapted to circumferentially surround the well, and provided with an opening through its circumference. A plurality of radially and inwardly projecting circular protrusions of a predetermined height are spaced around the circumference of the band and are adapted to be received into the well. Means are also provided for tensionably retaining this well obstructor on the hub.

In a preferred form of this embodiment, the circular protrusions are hollow, and are opened at their distal ends. In another preferred form of this embodiment, the circular protrusions are generally cylindrical in shape, and are integrally formed by mechanically extruding a portion of the annular band. In another form of this embodiment, the distal ends of these protrusions are adapted to abut against the well base when these protrusions are received into the well. The arrangement is such that the protrusions provide positive resistance to movement of the band into the well of the rim under the weight of the vehicle, and they also reduce the incidence of slippage or rotational movement of the band with respect thereto.

In another aspect of the present invention, a fastener assembly for drawing together spaced apart adjacent ends of band portions is provided wherein the ends of the bands have flanges thereon. This fastener assembly includes a threaded screw, which has a head end, a threaded end, a throat between the head end and the threaded end, and a retaining groove on the throat. A locking washer, which is adapted to be received onto the throat adjacent the bottom of the head is also provided. Locating means are provided which are adapted to fit into and to protrude partially from the retaining groove. A nut adapted to screw onto the threaded head of the screw is also provided. The fastener assembly further has a member which has a lower surface adapted to bear against one of the flanges. This member includes a hole which is adapted to receive the throat of the screw, but is smaller than the head of the screw. The upper surface of this member surrounding the hole is adapted to abut against the locking washer and the lower surface of the member surrounding this hole is adapted to abut against the upper surface of the locating means. A second member is also included which is adapted to bear against the other of the flanges of the adjacent ends of the band. This second member has a hole therethrough adapted to receive the threaded end of the screw and a lower surface which is adapted to abut against the nut. The nut is fixed to the second member to prevent relative movement therebetween.

This fastener assembly is assembled in a predetermined fashion with the locking washer received over the throat and adjacent the lower surface of the head of the screw. The first member is then received onto the throat of the screw, and the locating means are resiliently fitted into the groove to retain the first member between the locking washer and the locating means. Thereafter, the second member is received over the threaded end of the screw and the nut threaded onto the threaded end.

Among its other advantages, the fastener assembly may be employed to quickly and easily secure the ends of the band together, and if a component part is misplaced the possibility of the assembly being improperly installed with a substitute part is greatly reduced.

These and other objects, features and advantages of the present invention will be apparent from the following detailed description of the illustrative embodiments thereof which is to be read in conjunction with the accompanying drawings, wherein:

BRIEF DESCRIPTION OF THE DRAWINGS

FIG. 4A is a cross-sectional view, similar to FIG. 3, of a portion of an embodiment of the well obstructor band of the present invention installed in a deep well.

FIG. 4B is a cross-sectional view, similar to FIG. 3, of a portion of an embodiment of the well obstructor band of the present invention installed in a shallow well.

DETAILED DESCRIPTION OF THE PREFERRED EMBODIMENTS

Figures 1, 1A:
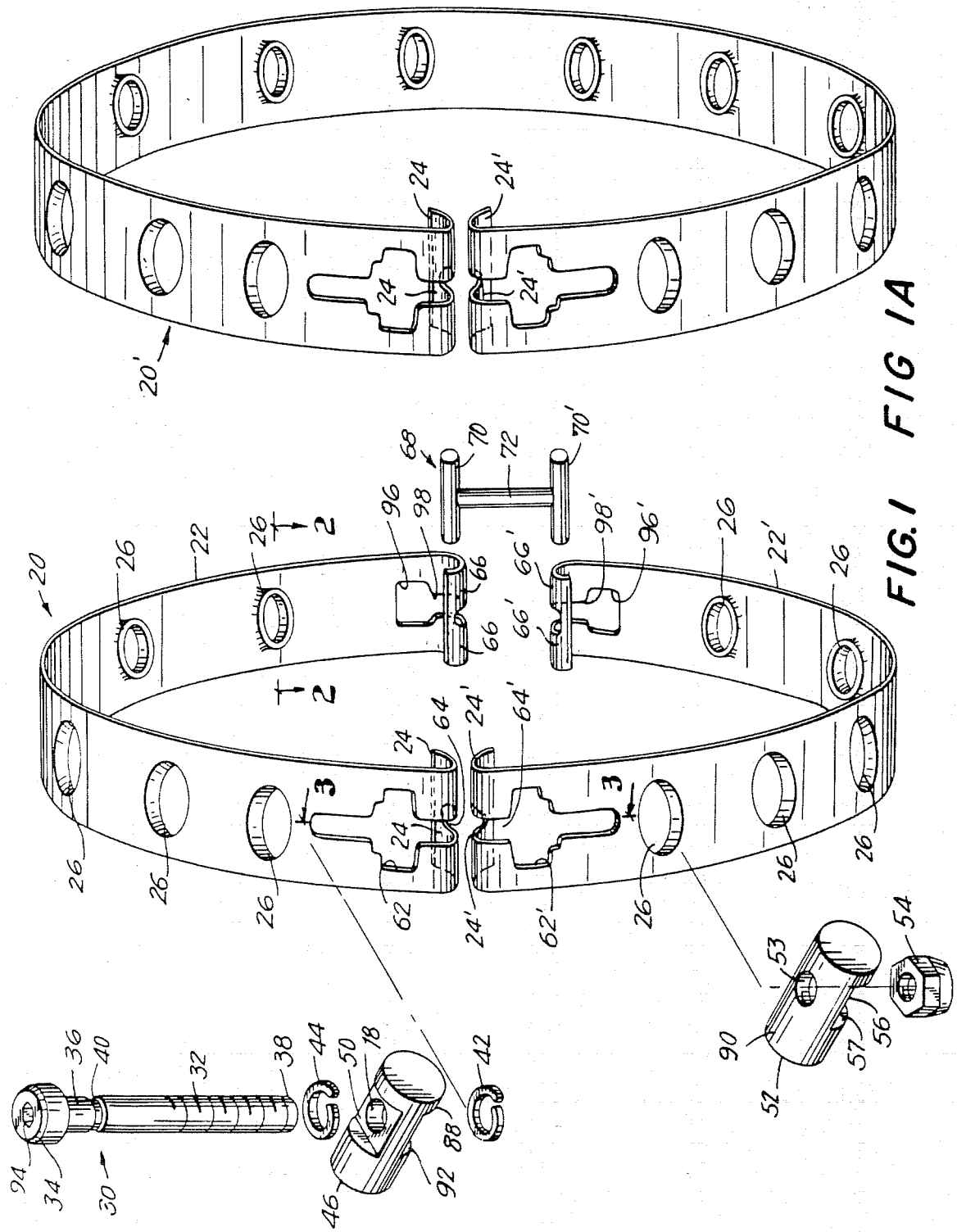
FIG. 1 is a perspective view of a two-piece well obstructor band in accordance with the present invention utilizing an inextensible I-shaped link between its two adjacent ends, and an enlarged exploded view of an embodiment of the adjustable fastener assembly.
FIG. 1A is a perspective view of another embodiment of the well obstructor band utilizing a single piece annular band.

Referring now to the drawings in detail, and initially to FIG. 1, a well obstructor in accordance with one embodiment of the present invention is illustrated. This well obstructor has two, semi-circular annular band portions 22 and 22'. These band portions are fabricated of a sturdy and relatively inextensible material, such as steel. Band portions 22 and 22' each include a plurality of circular protrusions spaced apart circumferentially around the band portions. These circular protrusions extend radially inwardly from the band and are preferably integrally formed with the band by mechanically cold extruding, or stamping, a portion of the band inwardly to form the circular protrusion. Mechanical extrusion, or stamping is preferred because of the relative ease with which such forming operations can be accomplished and also because the mechanical process of deforming the band material cold works the material, thus increasing its strength. The circular protrusions can also however, be separately formed and attached to the interior surface of the aband in any secure manner, such as welding.

Figure 2:
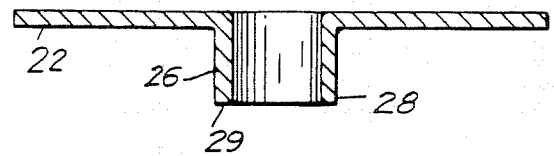
FIG. 2 is a cross-sectional view of one of the circular protrusions of the well obstructor band of FIG. 1.

Referring now to FIG. 2, one of the circular protrusions 26 is shown in cross-section. The circular protrusion has a generally cylindrical shape and is open at its distal end 28. The cylindrical shape gives great rigidity to the protrusion, while the protrusion remains lightweight and easy to form, thus making the well obstructor less prone to being crushed under the weight of the vehicle tending to press the bead of the tire against the well obstructor band.

Figure 2A:
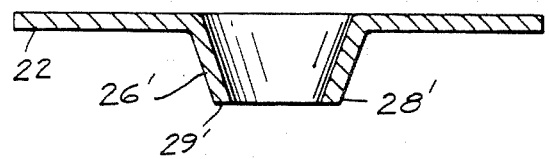
FIG. 2A is a cross-sectional view of another embodiment of the circular protrusions of the present invention, with a frustoconical shape.

As can be seen in FIG. 2A, the circular protrusion may also have the shape of a hollow, conical frustum 26', while still retaining its relatively strong and rigid characteristics. In both the embodiments of FIG. 2 and 2A, the circular protrusion is hollow with an open distal end, thus presenting a round, ring-shaped face 29 in FIG. 2 (or 29', as shown in FIG. 2A). The ring-shaped face significantly increases the coefficient friction between the circular protrusion and the base of the well of the hub when the well obstructor is installed. This helps to prevent undesirable rotation of the well obstructor with respect to the hub.

Figure 2B:
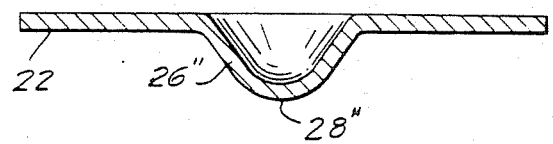
FIG. 2B is a cross-sectional view of another embodiment of the circular protrusions of the present invention, with a hemi spherical shape.

Still another embodiment of the circular protrusion is shown in FIG. 2B. In this figure, the circular protrusion 26" is formed in the shape of a hollow hemisphere. The hemisphere may have a closed distal end, as shown, or it may have an open distal end presenting a ring-shaped face (not shown) if increased friction is desired.

Figure 3:
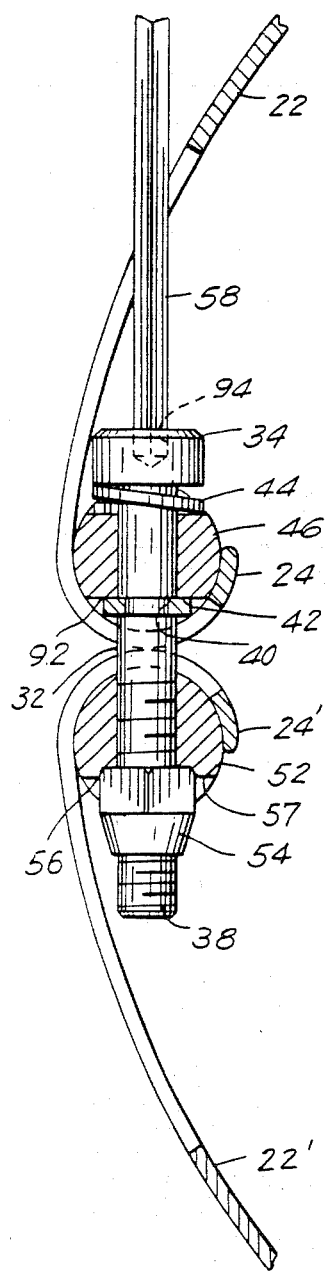
FIG. 3 is a cross-sectional view of an embodiment of the fastener assembly of FIG. 1 in the assembled condition shown with a tool inserted into the head end of the screw.
Figure 5:
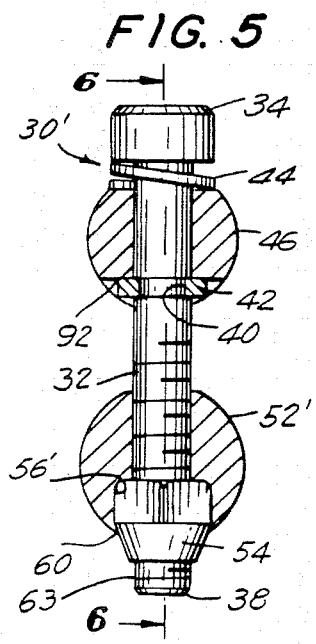
FIG. 5 is a partially cut-away view of an embodiment of the fastener assembly of the present invention.
Figure 6:
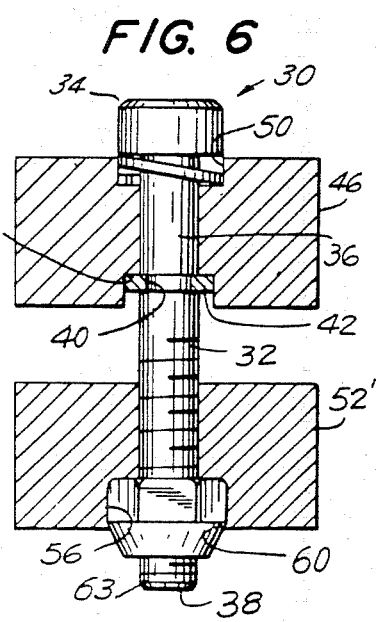
FIG. 6 is a partially cut-away view of the fastener assembly of FIG. 5, taken along line 6—6.
Figure 4:
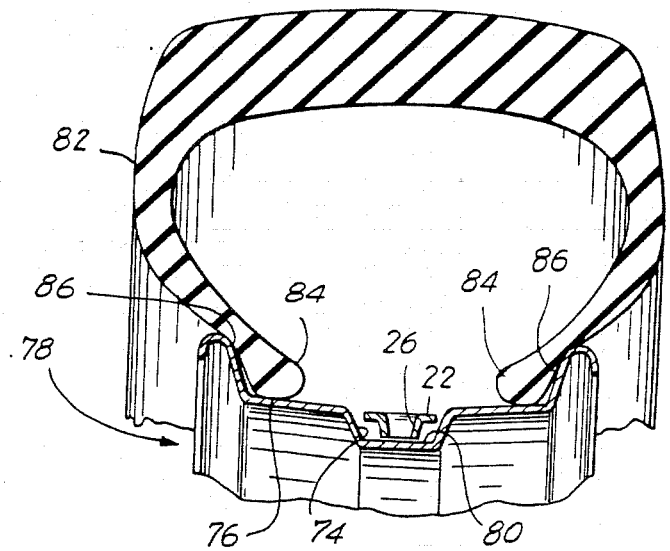
Figure 4:
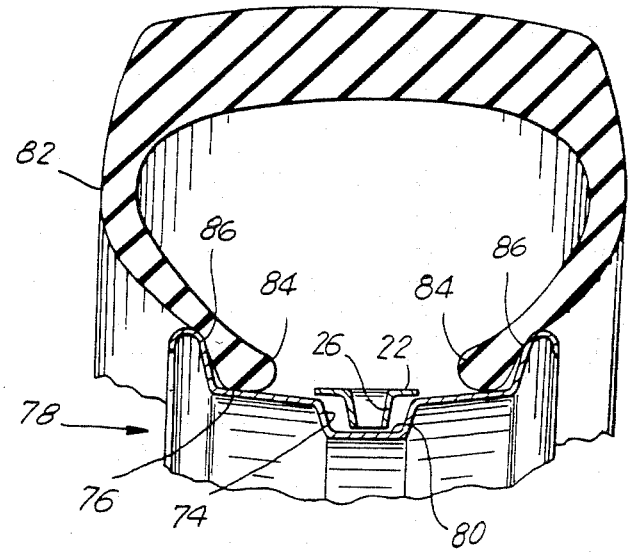

Referring again to FIG. 1, and also to FIGS. 3, 5 and 6, the fastener assembly for securing the adjacent ends of the band portions together is illustrated. The counterclockwise end of band portion 22 includes flanges or cradles 24. These flanges are bent inwardly, and preferably are bent partially around in the form of a semi-circular cradle or loop. The clockwise end of band portion 22' has similar flanges or cradles 24'. These flanges are adapted to receive and hold transverse beams 46 and 52 of the fastener assembly 30.

The fastener assembly includes a screw 32 which has an enlarged head 34, a throat portion 36 and a threaded end 38. The head of the screw has a generally circular and smooth outer diameter and a recess 94 adapted to receive an Allen head wrench 58. A locking washer 44 is fitted over the throat 36 of the screw 32 and abutted against the lower surface of the head 34 of the screw. The throat portion 36 is provided with an annular groove 40 which is adapted to receive a resilient locating ring 42.

The transverse beam 46 includes a hole 48 which is adapted to receive the screw and to fit on the throat portion 46 above the groove. The transverse beam 46 further has a flat countersunk portion 50 in its upper surface which securely abuts against the locking washer 44 when the fastener assembly is properly assembled. The countersunk portion also serves to decrease the overall length of the fastener assembly.

The transverse beam 46 is then received over the end of the screw 32 until the surface of the countersunk portion 50 is abutted against the locking washer 44. After the transverse beam 46 is in position on the throat of the screw above the groove 40, the resilient locating ring 42 is snapped into the groove to retain the transverse beam and the locking washer in position. As illustrated in FIGS. 1, 3, 5 and 6, a portion 92 of the lower surface of the transverse beam 46 is adapted to abut against the locating ring 42. Thus, when the resilient locating ring is in place, which is done at the factory prior to delivery of the fastener assembly to the user, the transverse beam and the locking washer will not be liable to becoming lost or improperly assembled by the user.

To complete the assembly, a second transverse beam 52, which has an unthreaded hole 53 and a countersunk notch 56 in its lower surface adapted to receive and abut against a nut 54 is then received over the threaded end of the screw and secured into position with the nut 54. This notch is adapted to receive the nut 54 with the flat edges 57 of the internal sides of the notch adjacent to the flat faces of the nut 54 so that rotation of the nut with respect to the second transverse beam is prevented. Rotation of the second transverse beam will, in turn, be prevented when the second transverse beam is placed into the flanges or cradles 24'. Because of this the fastener can be easily tightened blind using a tool such as Allen head wrench 58 inserted into the end of the head 34 of screw 32. Assembly and disassembly of the band is thereby simplified. The nut 54 is also preferably of the self-locking type, so that once tightened, loosening of the screw will be prevented. When tightened, the lower surface 88 of the first transverse beam 46 will bear snugly against the flanges 24, and the upper surface 90 of the second transverse beam will bear snugly against the flanges 24' to tensionably draw together the adjacent ends of the band portions 22 and 22' to hold the well obstructor band in tension surrounding the well of the hub with the distal ends of the circular protrusions abutted against the base of the well.

In order to make the fastener assembly even more resistant to being misinstalled or installed with parts missing, the assembly is preferably constructed utilizing the embodiment of the invention illustrated in FIGS. 5 and 6. In this embodiment, the transverse beam 52' includes a countersunk notch 56' which has a lip 60 extending slightly beyond the hexagonal portion of the nut 54. This lip 60 is then bent down over the nut to fixedly attach the nut to transverse beam 52'. Alternately, the transverse beam can be attached to the nut by other convenient means, such as spot welding. The end 38 of the screw 32 preferably has means on it s end, such as mechanically deformed threads 63, which will prevent rotation of the transverse beam along with its attached nut 54 off the end of the screw 32 even when the fastener assembly 30' is not held in the flanges or cradles 24 and 24'. Thus, the entire fastener assembly can be factory assembled with all parts permanently assembled in the proper relative positions. This eliminates the possibility that a careless user or installer might lose the locking washer 44, or use a non-self-locking nut in place of the self-locking nut provided.

Referring again to FIG. 1, the band portions 22 and 22' have holes 62 and 62', respectively, which are used so that the fastener assembly 30 or 30' can be conveniently installed onto the flanges 24 and 24' from the outside circumference of the band after loosening the fastener, but without the necessity for removal of the nut or either of the transversed beam. These holes are wide enough to receive the transverse beam either 46 or 52 from the outside of the band, so that the fastener assembly 30 can be installed from the outside of the band and inserted through slots 64 and 64', respectively, which are wider than the shank of the screw, to the interior side of the band, to be held in place by the flanges 24 and 24'. Once installed, the screw 32 is easily tightened by means of a single Allen head wrench 58, as shown in FIG. 3.

At the diametrically opposite ends of the band portions 22 and 22' of FIG. 1 are flanges 66 and 66'. These flanges are also preferably cradle or loop shaped, similar to flanges 24 and 24'. Flanges 66 and 66' are adapted to receive and secure an I-shaped inextensible link. The I-shaped link is composed of a shank 72 with transverse beams 70 at each of its ends. These transverse beams are preferably, though not necessarily, of the same diameter as the transverse beams 46 and 52 of the fastener assembly so that either the fastener assembly or I-shaped link can be used interchangeably on either set of flanges 24 and 24', or 66 and 66' without degradation of strength, in case of misassembly. This I-shaped member is installed with its transverse beams held in place by the flanges 66 and 66', respectively. When no tension exists on the I-shaped link 68, it can be easily removed from the flanges 66 and 66' through holes 96 and 96' of the band.

Like the holes for the fastener assembly, these holes are wide enough to receive the transverse beam of the I-shaped link from the outside of the band, so that the I-shaped link can be installed from the outside of the band and inserted through holes or slots 98 and 98', which are wider than the shank but smaller in width than the width of one of the transverse beams, to the interior side of the band to be held in place by the flanges 66 and 66'.

When the band portions 22 and 22' ar urged apart by imparting tension to the band, the I-shaped link will be securely held in position by the flanges 66 and 66' as long as this tension exists. As shown in FIG. 1A, if a single-piece band 20' is used, as might be the case with relatively small wheel hubs, the I-shaped link 68 can be omitted.

Figure 4:
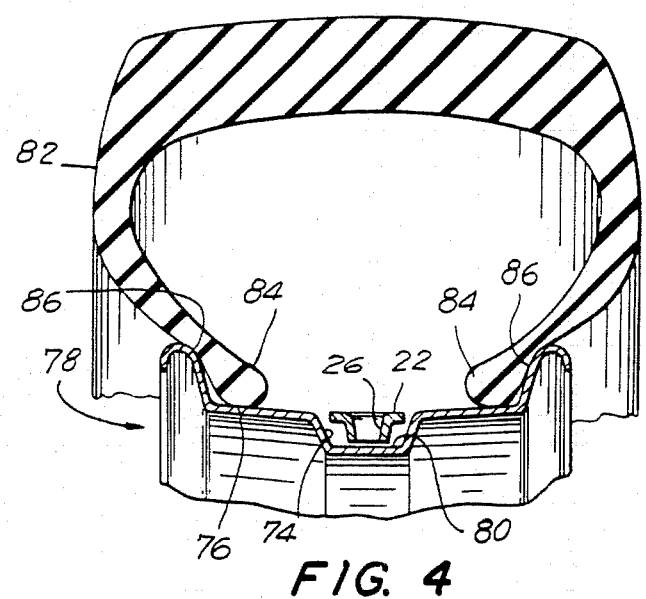
FIG. 4 is a cross-sectional view of a portion of an embodiment of the well obstructor band of the present invention, assembled onto the hub of the wheel rim, and with the tire fitted with its beads seated against the flanges of the hub.

Referring now to FIGS. 4, 4A and 4B, a portion of the well obstructor of the present invention is illustrated in cross-section installed surrounding the well 74 of the hub 76 of a wheel rim 78. The ring-shaped face of the circular protrusion 26 abuts against the base 80 of the well 74. A pneumatic tire 82 is installed with its beads 84 seated against the bead-retaining flanges 86 of the hub 76 in the normal position.

In FIG. 4, the circular protrusions 26 are approximately equal in height to the depth of the well 74. It is not necessary, however, that the height of the circular protrusions be equal to the depth of the well. Due to the superior strength of the circular protrusions, a well obstructor in accordance with the present invention can be installed in a well which is deeper than the height of the circular protrusions 26, as shown in FIG. 4A. The well obstructor can also be installed in a well which is shallower in depth than the height of the circular protrusions, as illustrated in FIG. 4B. This adaptability to different depth wells is due to the superior strength of the circular protrusions, which be relied upon to support the full weight of the vehicle. Thus, it can be seen that the present invention provides a band-type well obstructor which is sturdy, easy to form and to install, and which is adaptable to a wide variety of well depths.

The terms and expressions which have been employed herein are used as terms of description and not of limitation, and there is no intention in the use of such term and expressions of excluding any equivalents of the features shown and described or portions thereof. Although illustrative embodiments of the invention have been described herein with reference to the accompanying drawings, it is to be understood that various changes and modifications can be effected therein without departing from the scope or spirit of the invention.

What is claimed is:

1. A fastener assembly for drawing together spaced apart adjacent ends of a first band portion and a second portion, wherein said end of said first band portion has a flange thereon and said end of said second band portion has a flange thereon, said fastener assembly comprising:

a threaded screw having a head end, a threaded end, a throat between said head end and said threaded end, and a retaining groove on said throat;

a locking washer adapted to be received onto said throat adjacent said head end;

locating means adapted to fit into and to protrude partially from said groove;

a first member having a pair of opposed surfaces thereon, one of said surfaces being adapted to bear against one of said flanges, said first member further having a hole therethrough adapted to receive the throat of said screw but smaller than the head end of said screw, the other surface of said first member surrounding said hole being adapted to abut against said locking washer and said one surface of said first member surrounding said hole being adapted to abut against said locating means;

a nut adapted to screw onto the threaded end of said screw;

a second member adapted to bear against the other of said flanges of said band, said second member having a second hole therethrough adapted to receive the threaded end of said screw and a pair of opposed surfaces, one of the surfaces of said second member being adapted to abut against said nut, said nut being fixedly attached to said second member and prevented from rotating relative to said second member, said fastener assembly being assembled in a predetermined fashion with said locking washer received over said throat and adjacent said head end, said first member being received onto said throat, said locating means being fitted into said groove to retain said first member between said locking washer and said locating means, said second member being received over the threaded end of said screw and said nut being threaded onto the threaded end of said screw, said locating means preventing the removal of said first member and said threaded screw from said one flange while permitting rotational movement of said screw with respect thereto.

2. The fastener assembly as defined in claim 1, wherein said first member and said second member are transverse beams.

3. A fastener assembly as defined in claim 1, in which each of said first and second members is of cylindrical configuration, the ends of said band portions being bent inwardly along accurate paths conforming to the respective cylindrical surfaces of said members.

4. A fastener assembly as defined in claim 1, in which each of said ends defines an enlarged recess for receiving the corresponding member.

5. The device as defined in claim 1, wherein said head end is generally circular with a smooth outer diameter and a recess therein, said recess being adapted to engagably receive a cooperatively designed tool for rotating said screw.

6. The device as defined in claim 1, wherein said second member is received onto said threaded end and said nut is threaded onto said threaded end leaving a portion of said threaded end exposed, said exposed portion of said threaded end having means thereon for preventing the unscrewing of said nut off said threaded end.

7. A fastener assembly for drawing together spaced apart adjacent ends of an annular well obstructor band, said ends having inwardly disposed flanges thereon, said flanged being adapted to receive a screw therethrough, said fastener assembly comprising:

- a threaded screw having a head end, a threaded end, a throat between said head end and said threaded end, and a retaining groove on said throat;
- a locking washer adapted to be received onto said throat adjacent said head end;
- a locating ring adapted to fit into and to protrude partially from said groove;
- a first member having a pair of opposed surfaces thereon, one of said surfaces being adapted to bear against one of said flanges, said first member further having a hole therethrough adapted to receive the throat of said screw but smaller than the head end of said screw, the other surface of said first member surrounding said hole being adapted to abut against said locking washer and said one surface of said first member surrounding said hole being adapted to abut against said locating ring;
- a second member adapted to bear against the other of said flanges;
- a self-locking nut adapted to screw onto the threaded end of said screw, said second member having an opening therethrough adapted to receive the threaded end of said screw, and a surface adapted to abut against said self-locking nut, said nut being fixedly attached to said second member and prevented from rotating relative to said second member, said fastener assembly being assembled in a predetermined fashion with said locking washer received over said throat and adjacent said head end, said first member being received onto said throat, said locating ring being received onto said throat and resiliently fitted into said groove to retain said first member between said locking washer and said locating ring, said second member being received over the threaded end of said screw and said self-locking nut being threaded onto the threaded end of said screw, said locating ring preventing the removal of said first member and said threaded screw from said one flange while permitting rotational movement of said screw with respect thereto.

* * * * *